INVENTOR
Henry W. Van Leir.

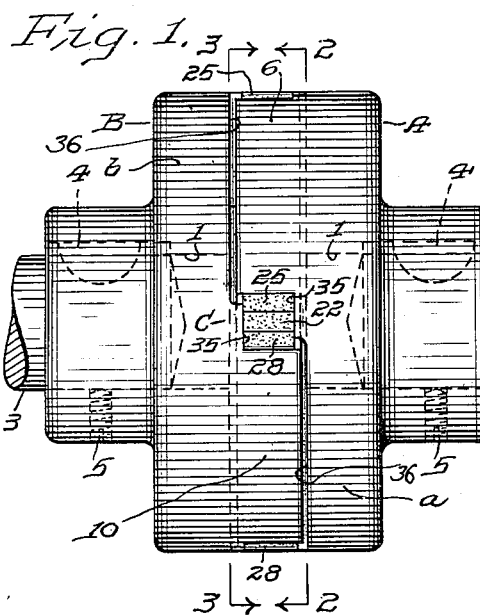

Patented Dec. 31, 1935

2,025,838

UNITED STATES PATENT OFFICE 2,025,838

INSULATING FLEXIBLE SHAFT COUPLING

Henry W. Van Leir, Philadelphia, Pa., assignor to Louis Ricefield, Oak Park, Ill.

Application October 18, 1928, Serial No. 313,236

8 Claims. (Cl. 64—14)

This invention relates to new and useful improvements in insulating flexible shaft couplings for connecting together the adjacent ends of two substantially alined shafts for the transmission of power from one to the other of said shafts and more particularly, to those flexible couplings wherein a power transmitting member of practically non-metallic material is introduced between the two coacting coupling heads and serves to electrically insulate from each other, the said heads and the two lengths of shafting which are connected by said coupling.

One object of my invention is to provide an insulating flexible coupling which will positively and efficiently transmit the rotary motion of one shaft to the other without noise or objectionable lost motion or substantial distortion of the intermediate insulating power-transmitting member thereof.

Another object of my invention is to provide a flexible coupling wherein the insulating non-metallic power transmitting portions are not subjected to any substantial strain or stress except that of compression, and wherein the power is transmitted from one head to the other head through the slightly resilient, and not permanently compressible, parallel-sided arms of a compression member of insulating material.

A further object of my invention is to provide, at a relatively low cost, a flexible insulating coupling of simple construction, of relatively small dimensions, easily made and assembled, of few parts, capable of transmitting relatively great power, and therefore highly efficient.

Other objects of my invention will appear in the specification and claims below.

In the drawings forming a part of this specification and in which the same reference characters are employed throughout the various views to designate the same parts, Fig. 1 is a side elevational view of my improved flexible coupling assembled and in which is used a three-ply intermediate power transmitting insulating member.

Fig. 2 is a transverse cross-sectional view taken on the line 2—2 of Fig. 1.

Fig. 3 is another transverse cross-sectional view taken on the line 3—3 of Fig. 1.

Fig. 4 is an end elevational view of a modified form of power transmitting member and consisting of two plies of non-metallic insulating material interposed between the driving lugs of coacting coupling heads.

Fig. 5 is a view similar to Fig. 2 showing a still further form of power transmitting member comprising three plies and wherein the construction illustrated in Figs. 5 to 9 forms the intermediate or central plies between the two plies of the member shown in Fig. 4.

Figure 6:
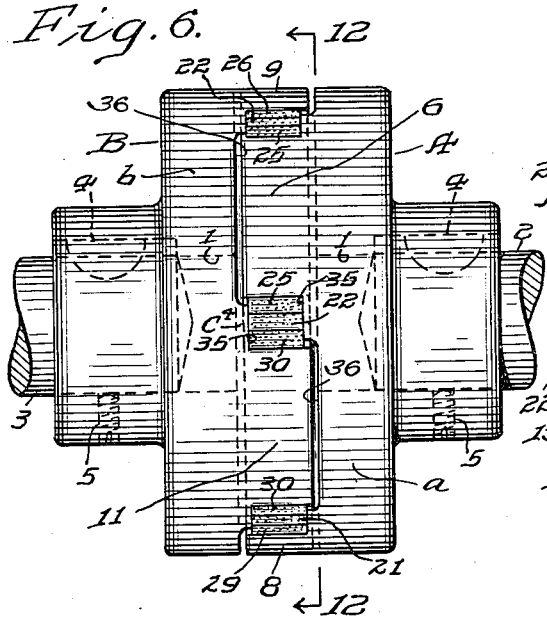
Fig. 6 is a side elevational view of a modified construction.

Referring first to the modification of my invention illustrated in Figs. 1 to 3 inclusive, my improved coupling comprises two coupling heads A and B which are preferably identical in construction, and an intermediate power transmitting member or element C. Each coupling head is preferably provided with an axial bore 1 adapted respectively to receive the ends of the shafts 2 and 3, and each head is preferably arranged to be secured to its shaft by a key and spline connection 4, to prevent any rotary movement of the head with respect to its shaft, and by a set screw 5 to prevent longitudinal movement of the heads with respect to their shafts, when assembled.

The coupling head A is provided on its face with two symmetrically arranged, diametrically oppositely disposed lugs or projections 6 and 7 extending outwardly from the face of the disk $a$ in a direction parallel to the axes of the bore 1 therethrough. The lugs 6 and 7 are alike in size and shape, and, therefore, the spaces therebetween are also diametrically opposite each other on the face of the disk and alike in size and shape, but they are circumferentially a little wider than the lugs or projections 6 and 7, to provide space between two adjacent lugs of a head for the reception of a lug of the other head and two arms of the compression or power transmitting member C.

The coupling head B is similarly provided with a like pair or series of lugs or projections 9 and 10 with recesses therebetween. The lugs 9 and 10 and the recesses between them are respectively exactly like the lugs 6 and 7 and the spaces between them of the said head A.

The operative edges 12, 13 or sides of each lug of both heads A and B lie in planes which converge toward the axis of the heads and are respectively parallel to the axis of rotation of the heads. The intermediate compression or power transmitting member C provides a plurality of parallel-sided branches or arms 14, 15, 16, 17, rectangular in transverse cross-section, alike in size and shape, each extending radially from the axis of said body. The adjacent arms or branches 14—15 and 14—17 and 16—15 and 16—17 may be connected near the center of the member by curved or bent sections 20, as plainly indicated in Figs. 1 to 3.

In Figs. 1 to 3, the arms are of three-ply construction, each ply being a strip of leather of even width, specially treated, or of some other somewhat flexible non-metallic material which is slightly resilient and not permanently compressible.

The compression members employed in all the couplings herein described may be of any suitable non-metallic material, such as leather, fiber, vulcanized rubber or layers of suitable fabric united by suitable binding material, such as bakelite or vulcanized rubber. The last mentioned materials are, however, preferred by me because of their durability, their insulating properties and high resistance to permanent compression, as well as to their quality of deadening or silencing any noise due to intermittent contact of metal therewith.

In the embodiment of my invention shown in Figs. 1 to 3, there are two crossed central plies 21 and 22, to each of which is imparted a permanent twist through an angle of 180° to form a helical portion 23 at the middle thereof. In Fig. 2 is illustrated the central ply 22 so provided with such a twist or helix 23, and in Fig. 3 is shown the other ply 21, provided with a similar twist or helix 23, but in the opposite direction. When these two plies 21—22 are so twisted, one right handed, and the other left, the twisted helical parts 23 will lie spirally flat against each other and so disposed may be firmly secured together at their centers in any suitable manner, as by a rivet 24.

Cemented under pressure to the radial arms of the central strips 21, 22 are the outer strips or plies 25, 26, 27 and 28, all of the same width as the inner strips or plies 21, 22. Each outer ply is securely cemented or molded to two adjacent radial arms of the inner plies. The curved portion 20 of each outer strip is pressed against the edges of the twisted portions 23 of the central plies 21, 22 so that the edges of the helical portions of the said central plies tend to stiffen and brace the curved portions 20 of the outer plies resting against them.

When so constructed each outer ply (25, 26, 27 and 28) is cemented to a radial arm of one of the central plies (21 or 22), and lies flat against one radial side (12 or 13) of a driving lug, and extends inwardly from the periphery of the head, is then bent or curved around the inner side of said lug, and then extends outwardly against the other radial side (13 or 12) of said lug, said outwardly extending portion being cemented to the adjacent radial arm of the central ply (22 or 21). Or taking the two outer strips 25 and 26, they both extend inwardly, each bearing against a face 12 of a lug 6—9 respectively, then they are bent in opposite directions, each around the inner side of a lug, and then extend outwardly against the adjacent, parallel radial sides 13—13 of the respective lugs 6 and 9.

The width of the strips forming the intermediate compression member C is made such as to definitely space the somewhat triangular end of each lug from the bottom of the recess in the other head into which the lug projects. The non-metallic member C, of course, insulates the adjacent operative sides or edges of any two adjacent lugs. There is, therefore, no possibility of any portion of one metal head coming into electrical contact with any portion of the other metallic head.

In couplings of this type, the thickness of the compression or power transmission member C depends considerably upon the amount of power to be transmitted thereby or therethrough. The thickness should be sufficient to prevent or resist any tendency of the compression member C to flatten out or become thinner or to spread by reason of the force of compression exerted thereon. In other words, the material should be slightly resilient, and not take a permanent set under the load to which it is subjected.

When, generally speaking, a large amount of power is to be transmitted through a flexible coupling, the size of the coupling head is relatively larger and the thickness of compression member is proportionally increased. In Figs. 1, 2, 3, 5, 6 and 7 are shown flexible couplings which are designed to transmit comparatively heavy loads and therefore the compression member is made relatively thick, of three plies as above indicated.

Figure 8:
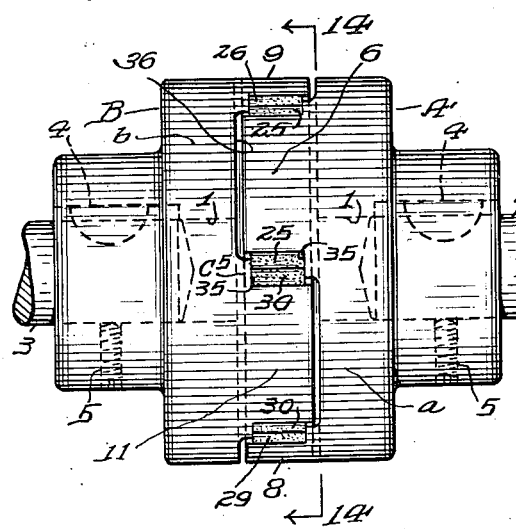
Fig. 8 is a side elevational view of another modification.
Figure 9:
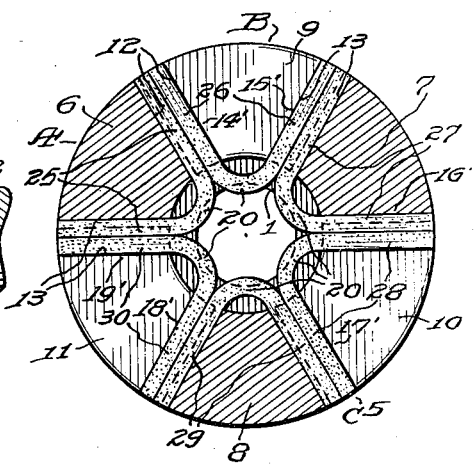
Fig. 9 is a transverse sectional view on the line 14—14 of Fig. 8.

For smaller couplings, through which a smaller power is normally transmitted, the diameter of the head may be smaller and the arms of the compression member may be made of two plies of material in the manner indicated in Figs. 4, 8 and 9 and which are composed of strips like the strips 25, 26, 27 and 28 of Figs. 2 and 3.

The modification shown in Fig. 4 is substantially like that shown in Figs. 1 to 3 except that the central plies 21 and 22 are omitted. This compression member $C^1$ comprises the members or plies 25, 26, 27 and 28, the radially extending portions whereof are connected firmly together by any suitable adhesive. The compression member $C^1$ fits between the lugs 6—9, 9—7, 7—10 and 10—6 forming radial arms $14^1$, $15^1$, $16^1$ and $17^1$ insulating the driving lugs and the coupling heads from each other.

In Fig. 5, I have illustrated a further modification of my invention. In it I have combined the structures shown in Figs. 4 and 5. That is to say, the strips 21′, 22′ comprising compression member $C^2$ are interposed between the strips 25, 26, 27 and 28 as were the compression strips 21 and 22 inserted between the same strips in the modification shown in Figs. 1 to 3. The central plies 21′, 22′ are thus made to replace the crossed twisted central strips or plies 21 and 22 of Figs. 1, 2 and 3. This provides a three-ply transmitting or compression member $C^3$ having arms $14^3$, $15^3$, $16^3$ and $17^3$ capable of being used over a long period of time without substantial wear or showing substantial compression, particularly when the shafts upon which the heads A and B are mounted are in practically true alinement and a bracing or stiffening of the curved portion 20 between the radially extending portions is not so necessary. When, however, the shafts are substantially out of alinement the curved portions 20 are subjected to more stretch or pull, due to the eccentricity of one of the heads with respect to the other and the consequent substantial radial slide of the coacting faces of the lugs on the power transmitting or compression member. This would tend to stretch out the curved portion 20 and to cause the arms, as a whole, to project beyond the periphery of the head, and under such conditions, the forms shown in Figs. 1 to 3 are better because of the stiffening of the curved portions and the holding of them against such stretching action of the lugs.

Figure 7:
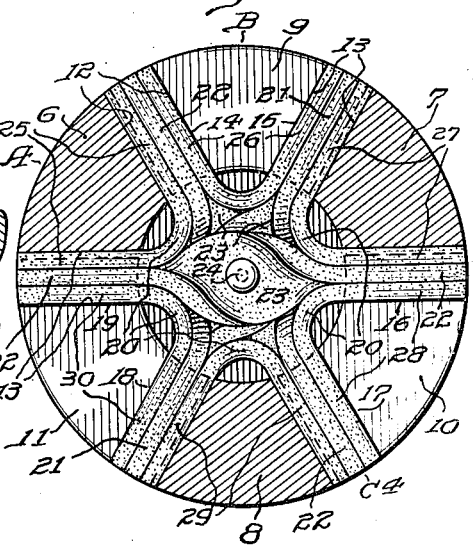
Fig. 7 is a transverse sectional view of the same on the line 12—12 of Fig. 6.

In the embodiments of my invention above discussed, I have shown but four driving lugs, 6—7—9—10, two to each head, and arranged in a circular series. In Figs. 6 to 9, I have shown two further modified forms of my invention, wherein each head is provided with a circular series of three driving lugs, 6—7—8 and 9—10—11 respectively. The compression or power transmitting member $C^4$ illustrated in Figs. 6 and 7 is similar to that illustrated in Figs. 1 and 2 except that it provides six arms and instead of using two twisted and crossed intermediate strips 21 and 22, one left-hand and one right-hand, it is provided with three strips, to wit, two like strips 21—21 (which may be twisted in one direction to form a helix) and a strip 22 (which should be twisted in the other direction to form a helix) between them. This compression member $C^4$ thus provides six radial arms 14, 15, 16, 17, 18 and 19, equally spaced, all alike, and like the radial arms 14, 15, 16 and 17, shown in Fig. 2. The lugs of each head are alike and similar to the driving lugs shown in the preceding modifications, except that there is an additional lug 8 on head A and an additional lug 11 on head B. The plies 29 and 30 around the lugs 8 and 11 are like the outer plies 25, 26, 27 and 28 around the lugs 6, 9, 7 and 10 respectively.

In Figs. 8 and 9 is shown a construction similar to that shown in Figs. 6 and 7 in that there are three lugs on each head A and B and the power transmission member $C^5$ providing six like arms 14', 15', 16', 17', 18' and 19' each composed of two plies, shown in Fig. 4. The two plies comprising each arm of the compression member $C^5$ are like the outer plies 25, 26, 27, 28, 29 and 30, shown in Fig. 7 and the radial arms 14', 15', 16', 17' are like those shown in Fig. 4.

In all the modifications above discussed and described, the side edges of the radial arms of the compression members $C'$, $C^2$, $C^3$, $C^4$, $C^5$ are seated on plane seats or surfaces 35, the width of which is a little less than the thickness of the arm of the compression member whereby each arm somewhat overhangs the seat upon which it rests, as clearly shown in Figs. 1, 6 and 7. Between these seats, the head is cored back a little to form the surfaces 36, so that when the heads are in their positions of nearest approach to each other the ends of the lugs on one head will be substantially spaced from the other head. In this manner the heads A and B will be completely electrically insulated from each other.

It is to be clearly understood that the letter C designates all the compression members illustrated in the various figures and that the exponential character associated with the said letter indicates a variation over or modification of the structure shown in Figs. 1 to 3.

Since the invention is frictionally used for coupling two shafts, one or the other of which "floats" slightly longitudinally or axially with respect to the other, (e. g. the driving shaft of an electric motor), I prefer to make the arms 14 to 19 inclusive of the compression members C narrower than the active surface of the said driving lugs, so that the ends of the lugs will overhang the faces of the arms of the compression member by a distance substantially equal to the relative longitudinal movement or "float" of the shafts with respect to each other so that when the heads separate to their utmost limit, the opposite faces of the arm will always be in engagement with the surface of the lug adjacent thereto and any wear due to float will be distributed over the entire surface of the arm. If the heads separate, due to float or lack of alinement sufficiently to expose at recurring intervals a portion of the wearing surface of the arm, the uneven distribution of the wear over the compression member resulting therefrom tends to produce ledges or shoulders in the surfaces of the arms between those portions which are always in engagement with the lugs and those portions which are in engagement with the lugs for a portion only of the time. In all the embodiments of my invention, therefore, the width of the arms of the compression member C is preferably less than the height of the lugs so that no such shoulders or ridges as have been above described, can be formed upon the surfaces of the arms. In all the modifications above described, the width of the arms 14 to 19 of the compression members C is such as to surely prevent the ends of the lugs on one head from coming into electrical contact with the metal of the other head.

Figure 10:
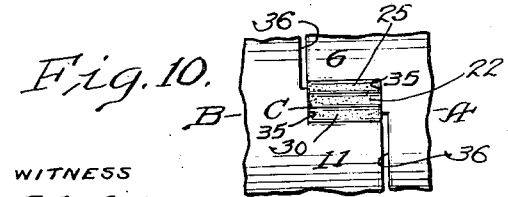
Fig. 10 is a fragmentary elevational view showing a slightly modified construction wherein the width of an arm of the power transmission member is substantially equal to the height of the driving lugs with the ends of the lugs of each head may be maintained out of contact with the metal of the other head.

When the shafts 1 and 2 have no axial movement toward and away from each other and are in alinement, the widths of the arms of the compression members C may be made equal to the height of the active driving faces of the lugs 6 and 11 in engagement therewith, as is clearly indicated in Fig. 10, but even then the coring or otherwise depressing of the surface 36 will prevent the ends of the lugs on one member from making metallic contact at the bottom of the recess in the other member.

Having thus described my invention, what I claim and desire to protect by Letters Patent of the United States, is:

1. In a flexible coupling, the combination with two like coupling heads, each having a circular series of like, equally spaced driving lugs extending parallel to the axis of the rotation of said heads, each lug of one head being positioned between two like lugs of the other head and the two driving edges of each lug being disposed in planes making an angle with each other and respectively parallel to planes coincident with the axis of the rotation of said heads, of a power-transmitting member having a plurality of radial arms of equal thickness, each arm respectively fitting into the space between a pair of coacting lugs of said respective heads and operative to maintain the ends of the lugs on each head out of contact with the other head, said member providing a plurality of like crossed strips of slightly resilient, but not permanently compressible, insulating material, and having outer plies firmly secured flat against the opposite sides of the radially extending portions of said crossed strips, each outer ply extending from the free end of one of said crossed strips inwardly around the inner side of the lug in contact therewith and then bending around the said inner side of said lug and then outwardly to the free end of the next adjacent crossed strip and firmly secured thereto.

2. In a flexible coupling, the combination with two like coupling heads, each head having a plurality of equally spaced driving lugs extending parallel to the axis of the rotation of said heads and with each lug of one head projecting into a space between two like lugs of the other head, the two edges of each lug being disposed in planes making an angle with each other and respectively parallel to planes coincident with the axis of the rotation of said heads, of a power-transmitting member providing a plurality of radial arms of the same thickness and of equal length, each arm fitting respectively into the space between a pair of coacting lugs of said respective heads, said arms being operative to slightly space the ends of said lugs on each head from contact with the other head, said arms having two like crossed strips of slightly resilient but not permanently compressible insulating material, each twisted in the opposite direction to the other through an angle of 180° around the longitudinal axis of said strips at a point midway between the ends of said strips, the twisted portions of said strips lying spirally flat against each other at the crossed points of said strips, and means to firmly secure said strips together at the twisted portions thereof.

3. In a flexible coupling, the combination with two like coupling heads, each having a circular series of equally spaced lugs extending parallel to the axis of the rotation of said heads, each lug of one head projecting into the space between two like lugs of the other head, the two driving edges of each lug being disposed in planes converging inwardly and respectively parallel to the planes coincident with the axis of rotation of said heads, of a power-transmitting member providing a plurality of radial arms, each arm respectively fitting into the space between each coacting pair of lugs of said respective heads, said arms being operative to space the ends of the lugs of one head from engagement with the other head, said arms having two like crossed strips of slightly resilient but not permanently compressible insulating material, each twisted in the opposite direction to the other through an angle of 180° about the longitudinal axis of said strips at a point substantially midway between the ends of said strips, said twisted portions lying substantially flat against each other at the crossing of said strips, and means for firmly securing said twisted portions together, said arms also having outer plies firmly secured flat against the opposite sides of each radially extending portion of said crossed strips, each outer ply extending from the free end of one of said crossed strips inwardly to the twisted portions of said crossed strips and then being curved and then extending outwardly to the free end of the next adjacent of said crossed strips and firmly secured thereto.

4. In a flexible coupling, the combination with two like coupling heads each having a circular series of equally spaced like driving lugs extending parallel to the axis of the rotation of said heads, each lug of one head being located in a space between the two lugs of the other head, the adjacent side edges of each pair of coacting lugs being parallel to each other and to a plane coincident with the axes of said heads, of a power transmitting member providing a plurality of radial arms, each arm filling the space between each pair of coacting lugs respectively and operative to maintain the ends of the lugs of each head out of contact with the other head, each arm of said member having two plies respectively in engagement with the adjacent parallel sides of a pair of coacting lugs, said plies extending radially inwardly from the periphery of said heads to the inner sides of said lugs, then curving in opposite directions, each around the lug adjacent thereto and then extending radially outwardly in engagement with the other radial sides of said lugs respectively.

5. In a flexible coupling, the combination with two like coupling heads, each head having a circular series of like, equally spaced driving lugs extending parallel to the axis of the rotation of said heads, each lug of one head projecting into the space between two adjacent lugs on the other head and the two driving edges of each lug being disposed in inwardly converging planes respectively parallel to planes coincident with the axis of rotation of said heads, of a power transmitting member of insulating material, having radial arms fitting respectively into the spaces between each pair of coacting lugs and operative to maintain the ends of the lugs of each head out of contact with the other head, each arm having two plies, each ply respectively passing around the inner side and the two substantially radial sides of a lug and respectively forming an outer ply of two adjacent arms.

6. In a flexible coupling, the combination with two like coupling heads arranged complemental to each other, the adjacent faces of said heads being each provided with a circular series of like equally spaced driving lugs projecting from said faces parallel to the axis of rotation of said heads, each lug on the face of one head being located in the space between two adjacent lugs on the face of the other head, the adjacent side edges of each pair of coacting lugs being parallel to each other and to a plane coincident with the axis of said heads, of a power-transmitting member of slightly resilient but not permanently compressible insulating material interposed between said heads, to maintain the ends of the lugs on each head spaced from the other head, said power transmitting member providing like radially extending arms and each arm being composed of a plurality of plies firmly secured together and filling the space between a pair of coacting lugs respectively, the outer ply of each arm extending inwardly from the periphery of said head and in engagement with one substantially radial side of a lug, then curving around the inner side of said lug and then extending outwardly in engagement with the other radial side of said lug, the ends of said arms being substantially flush with the periphery of said heads.

7. In a flexible coupling for connecting together two shafts which may have a slight longitudinal movement or float with respect to each other when rotating, the combination with two like coupling heads arranged complemental to each other, the adjacent faces of said heads being each provided with a circular series of like equally-spaced driving lugs projecting from said faces parallel to the axis of rotation of said heads, the lugs on the face of one head, being positioned within the space between two consecutive lugs on the face of the other head, the adjacent radial faces of each pair of coacting lugs being parallel to each other and to a plane coincident with the axis of rotation of said heads, of a power transmitting member providing a plurality of like parallel-sided, equally-spaced, radially extending arms, rectangular in transverse cross-section and of slightly resilient non-permanently compressible insulating material, said arms fitting the spaces between the said adjacent radial faces of each pair of coacting lugs respectively, the width of said arms measured longitudinally of said shafts being not greater and preferably less than the width of said radial faces of the lugs in engagement therewith, whereby the ends of said lugs overhang the adjacent sides of said arms by a distance at least as great as the said float of said shafts.

8. In a flexible coupling, the combination of a pair of coupling heads each adapted to be secured upon one of a pair of substantially aligned shafts and each having longitudinally extending driving lugs arranged to intermesh loosely with the lugs of the other coupling head, and an intermediate power transmitting member formed of resilient non-metallic material having radiating arms each fitting between and contacting with two of said lugs carried by opposite coupling heads, each arm comprising outer layers of non-metallic material which are extended around the inner margins of the contacting lugs and which are then directed outwardly to form the outer layers of two next adjacent radiating arms.

HENRY W. VAN LEIR.